G. BOOTH.
Kettle Handle.

No. 234,227.  Patented Nov. 9, 1880.

Witnesses:-
Louis M. F. Whitehead
John H. Elliot

Inventor:-
George Booth
by Ridout Aird & Co.
Atty

UNITED STATES PATENT OFFICE.

GEORGE BOOTH, OF TORONTO, ONTARIO, CANADA.

KETTLE-HANDLE.

SPECIFICATION forming part of Letters Patent No. 234,227, dated November 9, 1880.

Application filed May 17, 1880. (Model.)

*To all whom it may concern:*

Be it known that I, GEORGE BOOTH, of the city of Toronto, in the county of York and Province of Ontario, Canada, have invented certain new and useful Improvements in Kettle-Handles, of which the following is a specification.

My invention relates to that class of kettle handles or bails in which a wooden block or bar is attached to the top of the handle to serve as a protector against heat; and my invention consists of a sheet-metal handle made in one piece, beneath the top of which a wooden bar or block is inserted and secured in place by means of downhanging side flanges on the top of the handle, and forming a part thereof, to prevent lateral displacement, and screws passing through the sheet-metal handle and into the wooden block, as hereinafter more fully set forth.

Figure 1:
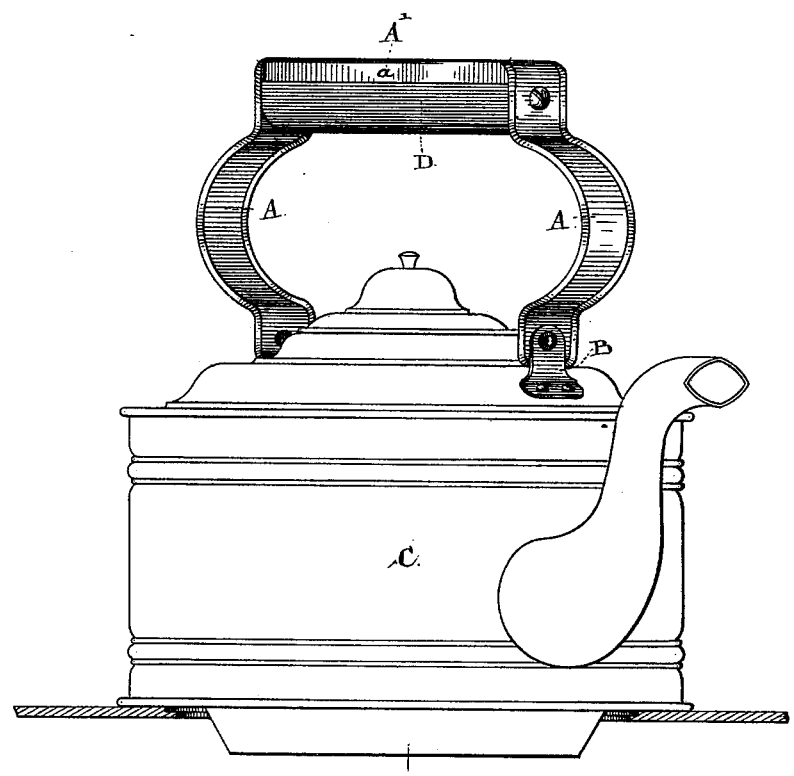
Figure 2:
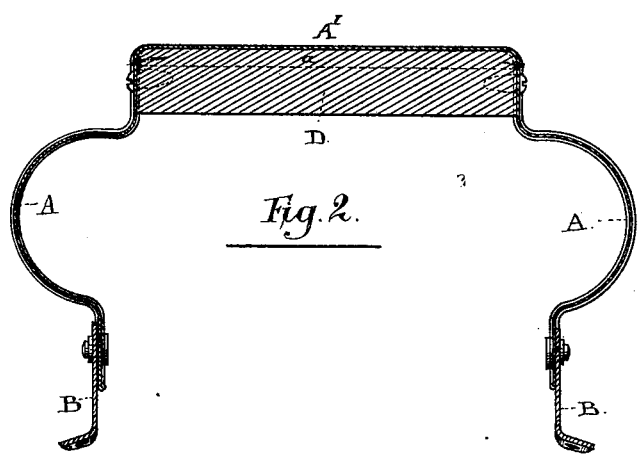

In the accompanying drawings, Figure 1 is a perspective view of a kettle with my improved handle, and Fig. 2 is a sectional view of the handle.

A A' represent a sheet-metal handle or bail, made in one piece, and provided with downwardly-hanging flanges $a$ on each side. The uprights A A of the bail are pivoted to the lugs B B, attached to the upper part of the kettle C.

D represents a wooden bar, preferably having its lower part rounded and its upper part rectangular, the upper face of the latter abutting against the lower face of the upper part A' of the handle, and its ends abutting against the downwardly-bent portions of the handle, to which it is secured by screws or other equivalent fastenings. The downwardly-hanging flanges $a$ on the sides of the upper part of the handle project over the upper part of the wooden bar D and prevent its lateral displacement. The sheet-metal handle A A', with its downwardly-hanging flanges, is made in one piece.

By constructing the handle A A' of a sheet-metal plate made in one piece it can readily be bent into form, pivoted to the lugs, and the wooden bar inserted and securely held in place, thus forming a cheap and simple handle, effectually protecting the hand from heat in taking hold of the bail.

I am aware that a kettle-handle provided with a bar of wood at its upper end to protect from heat the hand of a person grasping the bail is common; and I am also aware that a guard-piece notched at its ends to engage with the opposite sides of a bail and secured to the top of the bail by means of a metal clamp-plate partially embracing the bail and guard has heretofore been employed, and I therefore lay no claim to such construction, my invention being confined to the details of construction pointed out in the claim.

I claim—

The combination, with the kettle C, having the lugs B, of the sheet-metal handle A A', pivoted to said lugs, made in one piece, bent as shown, and provided with the downwardly-hanging flanges $a$ on the top of the handle, and the wooden bar D, secured to the upper part of the handle by the flanges and screws, substantially as described, and for the purpose set forth.

Toronto, 22d day of December, A. D. 1879.

GEO. BOOTH.

In presence of—
JOHN G. RIDOUT,
DONALD C. RIDOUT.